July 28, 1925.
M. SHARP
DRIVING BELT FASTENER
Filed April 6, 1922
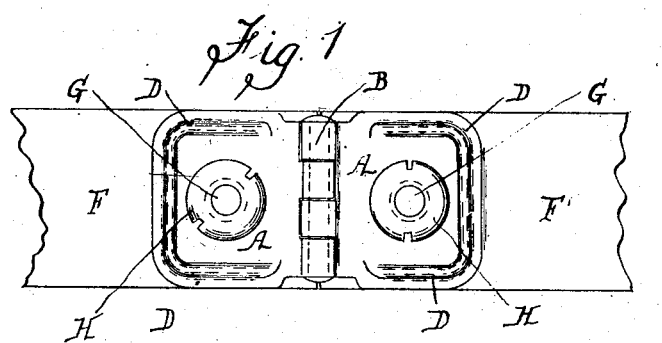
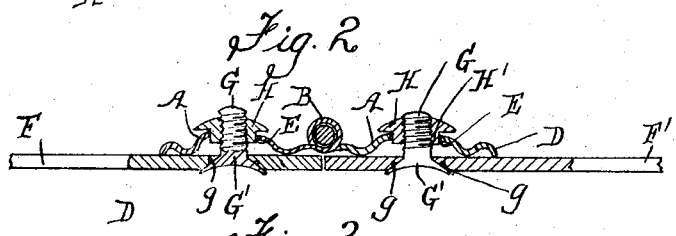
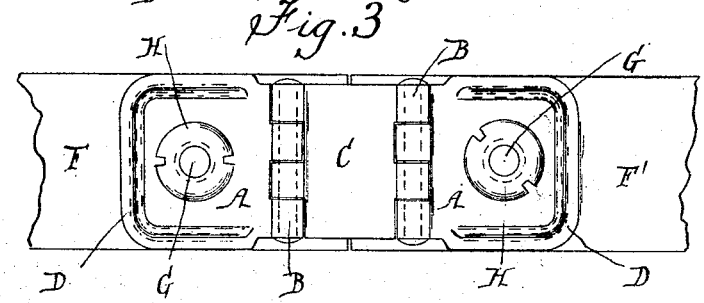
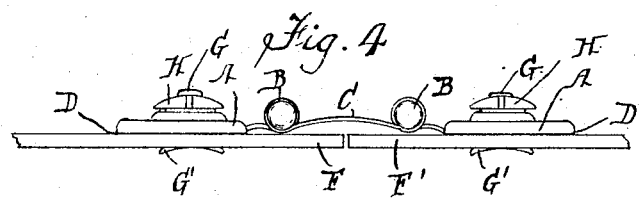

Patented July 28, 1925.

1,547,694

UNITED STATES PATENT OFFICE.

MATTHEW SHARP, OF NEWMARKET, AUCKLAND, NEW ZEALAND.

DRIVING-BELT FASTENER.

Application filed April 6, 1922. Serial No. 550,137.

*To all whom it may concern:*

Be it known that I, MATTHEW SHARP, subject of the King of Great Britain, residing at Newmarket, Auckland, in the Dominion of New Zealand, have invented a new and useful Improvement in Driving-Belt Fasteners, of which the following is a specification.

This invention relates to an improved form of fastener that has been devised for connecting together the ends of machinery driving belts of all kinds.

The fastener devised is adapted by its construction to provide for the two ends being connected, making a butt joint with one another so that smooth running of the belt on the pulleys is ensured and also for the connection being hinge jointed to permit of the belt's free curving round the pulley thereby providing for its grip on the pulley throughout the whole of its engagement therewith.

The improved fastener is formed of metal plates that are hinge jointed together and are arranged so that they extend over the outside faces of the respective belting ends and are then fastened to such ends by means of clamping screws extending through the respective plates and belt ends. Each of such plates is formed in a special manner such as to provide for it effectually gripping the belt surface when it is screwed down thereon. In some cases, the plates, instead of being hinged to one another, may be hinged to the respectively opposite edges of an intermediate plate.

The invention and manner of using it, are shown in the accompanying drawings, in which:—

Figure 1 is a plan of the fastener in one of its forms and in working position on the belt ends.

Figure 2 is a longitudinal sectional elevation thereof.

Figure 3 is a plan of the fastener in its other form.

Figure 4 is a side elevation thereof.

A—A are the plates forming the fastener, connected together, directly in the form shown in Figures 1 and 2, by a strong hinge joint B, and in the form shown in Figures 3 and 4, hinge connected by hinges B with a narrow plate C. These plates are formed of a suitable metal, preferably of a slight springy nature, as steel. Each plate is also made so that it arches upwards at its center from all of its four edges so that a ridge D is thereby formed all round. Each plate also is formed with a circular hole E in the middle of its arched portion.

In use the two plates are laid on the outside surfaces of the respective belt ends F—F' to be joined, the two ends being butted together in the manner shown in the drawings, so that in the case of the form illustrated in Figures 1 and 2, they will lie coincidentally with the hinge, and in the form illustrated in Figures 3 and 4, their ends will extend across beneath the middle line of the plate C. The plates are made of different widths to suit different widths of belts and so that they extend approximately across the full width of the belt on which they are fastened.

Each plate is then fastened on its belt end by means of a short stud bolt G provided for that purpose. The stud bolt has its stem passed outwards through an aperture made in the belt to receive it and has a disc shaped head G' that engages the inside face of the belt and is adapted to countersink itself into the belt. The top face of this head is formed with small barbs $g$ thereon which bite into the belt and hold the bolt from turning. The head also is preferably formed with a concave curve, extending in the line of the belt so that the head's surfaces will conform more to the curve in the periphery of the pulleys on which the belt runs. Each stud bolt is provided with a nut H of special form that is screwed on to its outer end. This is formed with a boss H' on its underside that passes into the aperture E in the plate A so that the edge of the nut will then engage the edge of such aperture and by the screwing down of the nut will effectually force the plate hard on to the belt end with which it engages. This engagement on the belt is given a non-slipping grip effect by the upward arching of the plate at its middle the belt being drawn upward into such arch so that the ridge D on the plate will bite into it all round the edge.

In the use of a belt thus fastened, the plates will gradually bend to the contour of the pulleys on which they run so that smooth effective running is effected and the grip of the belt on the pulleys maintained throughout the full length of the belt. The intermediate plate C used in the form shown in Figures 3 and 4 may be also given an initial upward curve along its width to obtain a like effect.

With large belts, the fasteners may be made to take two or more stud bolts G across its width.

I claim:—

A driving belt fastener formed by two metal plates hinge jointed together and adapted to be arranged respectively on the outside surfaces of the two belt ends, each plate being shaped with an upward arch at about its middle and having a concavity under the edge, and means for securing each plate to its belt end, consisting in a stud bolt passing out through the belt end and through the arch in the plate and having a countersinking head with barbs formed on its upper side, and a nut screwed on the stem of the bolt and engaging the plate, said nut having a boss on its under side projected into the bolt opening of the plate so that the edge of the nut engages the edge of said opening.

In testimony whereof, I affix my signature.

MATTHEW SHARP.

Witnesses:
DAVID BROWN HUTTON,
EDMUND HADLEY HODGKINSON.